United States Patent [19]

Meuret

[11] Patent Number: 4,599,976
[45] Date of Patent: Jul. 15, 1986

[54] RECIPROCATING ROTARY PISTON THERMAL ENGINE WITH A SPHERICAL CHAMBER

[75] Inventor: Paul V. Meuret, La Seyne-sur/Mer, France

[73] Assignee: Societe a Responsabilite Limitee Datome, La Seyne sur-Mer, France

[21] Appl. No.: 676,637

[22] Filed: Nov. 30, 1984

[30] Foreign Application Priority Data

Dec. 13, 1983 [FR] France .................. 83 20083

[51] Int. Cl.$^4$ ............................................. F02B 53/00
[52] U.S. Cl. ................... 123/18 A; 123/193 P
[58] Field of Search ............ 123/193 R, 193 P, 18 R, 123/18 A

[56] References Cited

U.S. PATENT DOCUMENTS 3,315,648 4/1967 Castillo ......................... 123/18 R

FOREIGN PATENT DOCUMENTS 0744453 4/1933 France .................. 123/18 R
0894646 12/1944 France .................. 123/18 A
2375439 7/1978 France .
0577656 5/1946 United Kingdom .

Primary Examiner—Craig R. Feinberg
Attorney, Agent, or Firm—Balogh, Osann, Kramer, Dvorak, Genova & Traub

[57] ABSTRACT

The engine comprises a spherical chamber within which moves a dual piston mounted to rotate reciprocatingly about a shaft going through the center of said chamber, the chamber being closed by a cylinder head. Said piston is basically shaped as a semicircular vane and is attached to a cylindrical shaft. It extends orthogonally along the shaft's generatrices. Said piston has a slightly smaller radius than the spherical chamber so that it moves about near the inside wall of said chamber. Sealing is provided between the piston and the chamber in the form of at least one sealing strip embedded in a groove in the periphery of the piston. The cylinder head extends across the diameter of the chamber and has, on at least one of the sides of the shaft and near thereto, an edge extending parallel to said shaft's generatrices. Sealing is provided between said shaft and said cylinder head in the form of at least one sealing insert embedded in a groove in the length of said edge.

9 Claims, 14 Drawing Figures

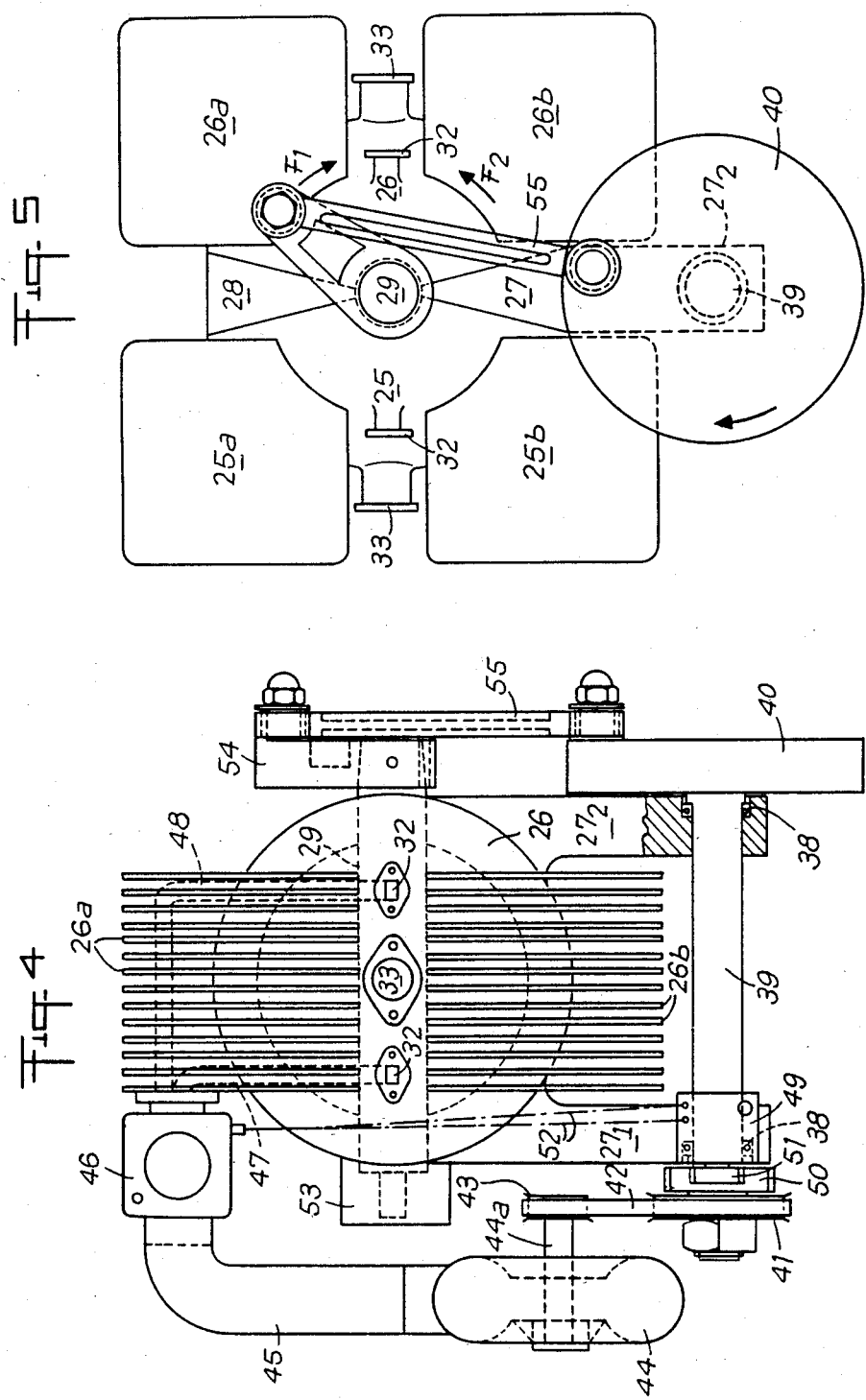

RECIPROCATING ROTARY PISTON THERMAL ENGINE WITH A SPHERICAL CHAMBER

This invention concerns a reciprocating rotary piston thermal engine with a piston moving in a spherical chamber.

The technical field of the invention is that of internal combustion engines.

The advantages of a conventional piston engine are well known: piston/cylinder tightness, lining capability and ease of machining, sealability of attached cylinder head using a flat gasket, advantageous combustion chamber and more.

The disadvantages of such an engine relate mainly to its bulkiness and heavy weight, which are both due to its required number of cylinders, and to such factors as crankshaft construction and rodding.

The rotary piston engine is also well known.

However, the continuous rotation sought therein runs into a number of drawbacks such as sealing problems, low compression ratio resulting in low efficiency, "flat" combustion chambers and so on.

The object of the present invention is an internal combustion engine with high efficiency and being of lighter construction, operating with two or four-stroke cycles.

The engine provided in accordance with the invention comprises a spherical chamber ($1a/2a/25a/26a$) in which moves a piston ($5/29$) reciprocatingly rotatively mounted about a shaft going through the center of said chamber, which chamber is sealed by a cylinder head, said engine further comprising external means ($40/54/55/56/57/58$) for changing the alternating rotation of the piston into a continuous rotation, said engine wherein the piston has the overall shape of a semicircular vane integral with a rotating shaft ($5a/29a$) and extending orthogonally along the generatrices of the shaft, said piston having a slightly smaller radius than that of the spherical chamber so that it can rotate near the inside wall of said chamber, sealing between the piston ($5/29$) and the chamber ($1a/2a/25a/26a$) being obtained by means of at least one strip ($9/31$) embedded in a groove ($5b_2/29b_4$) in the periphery of the piston and wherein the cylinder head ($3/4$-$27/28$) extends along the diameter of the chamber and comprises, in relation to at least one side of the shaft ($5a/29a$) and near thereto an edge ($3c/4c/27e/28e$) parallel to said shaft's generatrices, sealing between the shaft and said cylinder head being provided by at least one insert ($11/35$) embedded in a groove ($3c_1/4c_1$-$27e/28e$) in the entire length of said edge.

The invention thus provides an internal combustion engine having at least one spherical chamber in which moves a reciprocating rotary piston.

Such an engine is compact, even with a large number of chambers, and thus affords a high power-to-weight ratio compared with conventional piston engines. Due to the piston's reciprocating action and to the fact that a sphere affords a large volume for a minimal wall area, this engine yields a significantly larger piston-swept volume (or equivalent displacement factor) than the actual volume of the sphere. In an engine of this type designed to operate on the basis of a cycle termed the two-stroke cycle, there is one firing per chamber and per to and fro movement of the piston or pistons, and therefore four firings per to and fro stroke in the case of a dual-piston arrangement, thus more power.

Another advantage of such an engine is that it allows easy access to components thereof. Its design, based upon one or more chambers shaped as spherical wedges, makes available a considerable area for the location of ignition and exhaust ports for a two-stroke engine, with pistons having a more useful perimeter given the large radii of segmental faces involved.

This also provides a larger heat exchanging surface area for the cooling fluid. It is also worthy of notice that according to the design of the piston, the latter can be cooled by fluid made to flow inside the shaft.

The spherical design of the engine provides high resistance to internal pressures and an ideal condition for its expansion.

The piston's reciprocating action enables direct transfer of pressure forces from one side of the piston to the other. Thus, a compression force on one side of the piston is subtracted directly from an expansion force; on the other side the same transfer occurs if the subtraction must take place between the two pistons. Accordingly, the rods and the rotational power takeoff shaft are not stressed by these forces which they are not required to transmit. The dual-piston design is also advantageous in terms of torques which, in the present case of a two-stroke engine, are perfectly realized.

A further advantage of the engine according to the invention resides in its building block type features.

The engine according to the invention differs from a conventional engine in that it involves a separation between the actual power plant -- spherical in this case -- in which the thermodynamic conversions take place and the mechanisms for converting alternating rotation into continuous rotation. This separation, being at the level of the output of the piston shaft, allows a variety of special purpose mechanisms to be adapted in view of driving different machines. For example, a ship or aircraft propeller can be driven directly from the rotational power takeoff shaft, taking advantage of its inertia while at the same time economizing on weight.

The building block design of the engine makes it possible to put together modular engines by combining them in a line or star pattern or by distributing them among several driving wheels and so on.

Such a modular design makes it easy to replace defective components or units and even to take one engine out of service in an assembly of several engines.

The engine according to the invention thus draws a number of major advantages due in particular to its separating the thermal process from the mechanical driving and converting components, which functions are intermingled in conventional piston engines.

Other advantages and features of the invention will become more readily apparent in reading the following description of various embodiments of a thermal engine with spherical combustion chambers with reference to the drawings appended hereto, in which:

FIG. 4 is an elevation of the engine illustrated in FIG. 3;

FIG. 5 is an outside view taken along arrow F of FIG. 4 showing in greater detail the connecting rod assembly, which is the same as that used in the engine illustrated in FIG. 1;

FIGS. 7 through 10 schematically illustrate the operation of a two-stroke engine according to the invention;

and FIGS. 11 through 14 diagram the operation of a four-stoke engine according to the invention.

Figure 1:
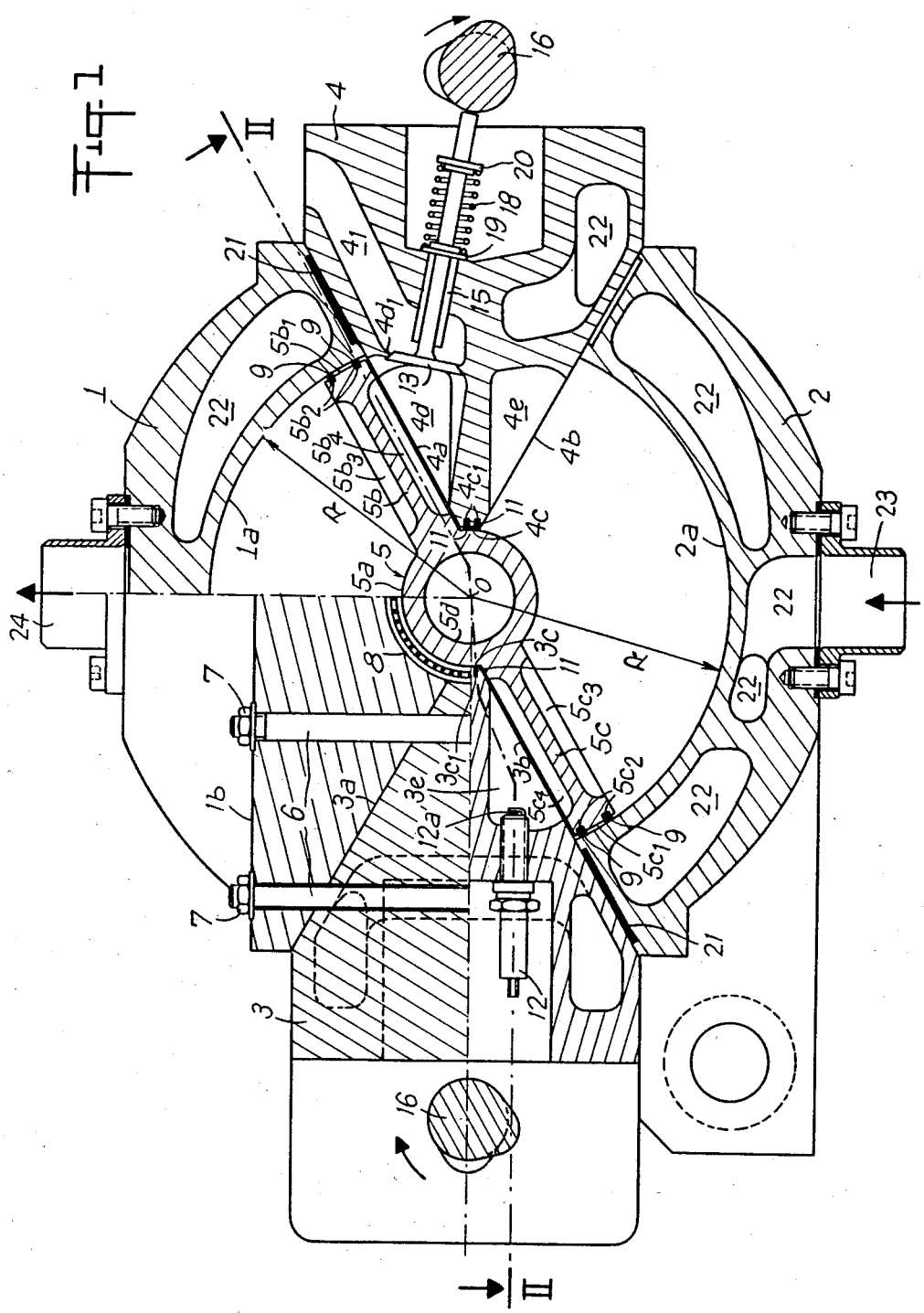
FIG. 1 is a cutaway view across an engine according to the invention designed to operate on a four-stroke cycle.
Figure 2:
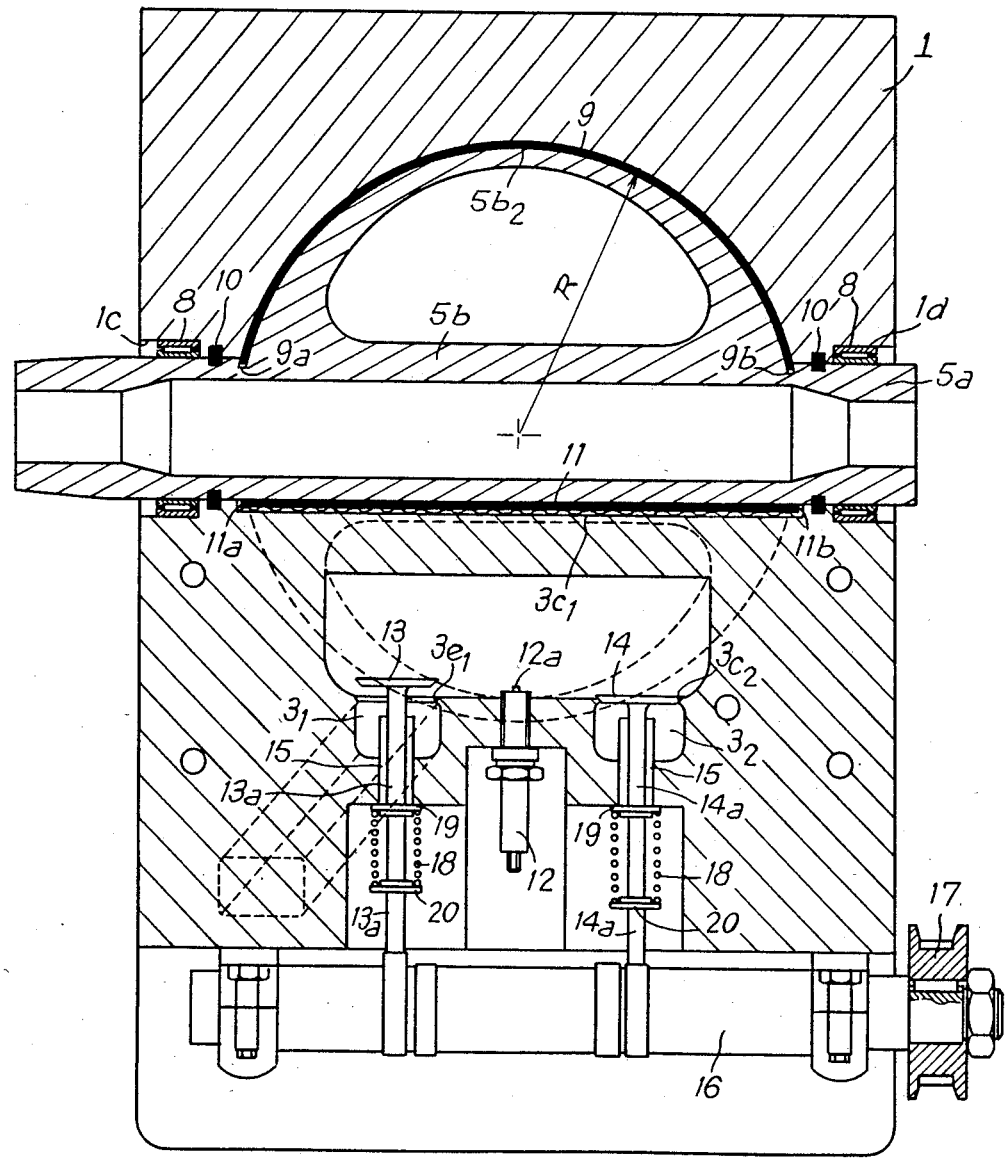
FIG. 2 is a cutaway view taken along elbowed line II—II of FIG. 1, of the same engine, the camshaft and valves whereof are brought into view.

Referring first to FIGS. 1 and 2, the four-stroke engine according to the invention comprises two halfshell crankcases 1 and 2, in the shape of two spherical wedges which are sealably attached to the straight sides, appearing as isosceles triangle legs in the drawing, of two wedge -shaped cylinder heads 3 and 4 whose said sides $3a$, $3b$, $4a$, $4b$ converge in pairs toward a line going through the center 0 of a spherical enclosure. Each of the crank case half shells 1, 2 comprises a spherical chamber $1a$, $2a$ with a radius R, which together constitue said spherical enclosure and are bounded by the inside spherical surface of the half shells and the plane surfaces $3a$, $3b$ and $4a$, $4b$ of the two cylinder head wedges 3 and 4.

Within said enclosure, a rotor or dual piston 5 is mounted for reciprocating rotation about a transverse axis passing through the center 0 of the sphere. The piston or rotor 5 consists of a cylindricl shaft $5a$ and two pistons $5b$, $5c$ attached thereto and extending in diametrically opposite directions such that pistons $5b$ moves within spherical chamber $1a$ and piston $5c$ moves within spherical chamber $2a$.

The two pistons $5b$, $5c$ are shaped as semicircular vanes whose peripheries $5b_1$, $5c_1$ reach nearly to the inside wall of chambers $1a$, $2a$. Thus, as shown in the example of FIG. 1, the pistons $5b$, $5c$ are shaped as segments of a sphere.

The crankcase half shells 1, 2 and the cylinder head wedges 3, 4 are assembled together by means of several screw-pins 6 located to each side of the piston bearings, the fastening nuts 7 of said pins being tightened against a sort of flange $1b$, $2b$ provided at the periphery of each crankcase half shell 1, 2.

The dual piston 5 is mounted for reciprocating rotation in two needle bearings 8 force fitted by known means around shaft $5a$ in cylindrical recesses $1c$, $1d$ provided in the half shells to each side of said spherical chambers and coaxial with said shaft.

The edge $5b_1$, $5c_1$ of pistons $5b$, $5c$ is given two parallel grooves $5b_2$, $5c_2$ each of which is provided with a sealing strip 9. Each strip 9 thus extends along the periphery of the pistons and, for the purpose of perfecting the sealing action between the piston and the spherical chamber in which it rotates, said strips are made to extend at their ends $9a$, $9b$ (FIG. 2) into the body of the shaft $5a$, said grooves $5b_2$, $5c_2$ continuing part-way into the body of said shaft, to a depth of about three millimeters. Tightness around the bores through which pass the ends of shaft $5a$ is provided by ring seals 10 fitted between the spherical chambers $1a$, $2a$ and the needle bearings 8.

As illustrated in FIG. 1, piston $5b$ sweeps chamber $1a$ from cylinder head wedge 3 face $3a$ to cylinder head wedge 4 face $4a$; piston $5c$ sweeps chamber $2a$ from cylinder head wedge 3 face $3b$ to cylinder head wedge 4 face $4b$. At end-of-stroke, the pistons are parallel and close to said faces. The inside edge $3c$, $4c$ of each cylinder head wedge, from which said plane faces flare out, is close to the shaft 5 of the dual piston and extends from one wall to the other of the spherical enclosure parallel to said shaft. In one embodiment, it is provided with two straight grooves $3c_1$, $4c_1$ containing sealing elements 11. The seals, namely sealing strips 9 and elements 11, are thrust forward from their sides opposite the inside of their groove by means of a crinkled blade spring in a known manner.

For a better seal between the cylinder head wedges 3, 4 and the shaft 5, the ends $11a$, $11b$ of sealing elements 11 extend into the inside wall of the spherical chambers $1a$, $1b$, to a depth of, say, 3 millimeters.

Each cylinder head wedge 3, 4 comprises cavities $3d$, $4d$ and $3e$, $4e$ opening onto the plane faces $3a$, $4a$ and $3b$, $4b$ and housing the ignition means or air/fuel mixture injecting means. In the example shown, each cylinder head wedge 3, 4 is provided with two spark plugs 12 screwed into a tapped hole in the cylinder head wall, the electrodes whereof $12a$ emerge inside of a cavity. One plug 12 projects into cavity $3e$ and cavity $3d$ (not shown) of cylinder head 3 and another plug (not shown) projects into cavity $4d$ and into cavity $4e$ of cylinder head 4. Said cavities $3d$, $3e$, $4d$, $4e$ also comprise, on either side of each spark plug 12, circular air intake ports $3d_1$, $3e_1$ and $4d_1$, $4e_1$ and combustion gas exhaust ports $3d_2$, $3e_2$ and $4d_2$, $4e_2$ which communicate with the corresponding flow pipes $3_1$, $3_2$, $4_1$, $4_2$. In a known manner, all of said ports $3d_1$ through $4e_2$ are bounded by a truncated wall, flaring out towards said cavities to form seats for the intake valves 13 and exhaust valves 14 the stems $13a$, $14a$ whereof are slidably mounted in guide bushes 15, said bushes being for example press fitted into the body of the cylinder head in front of a cam on a camshaft 16, rotatably mounted on the outside of the cylinder head by means for example of a cogged belt cooperating with a pulley 17 or any other suitable known timing means. Said valves 13 are held in said seats by means of compression springs 18 inserted between the retainers 19, 20, one of which 20 is attached to the valve stem $13a$, $14a$.

Tightness between the crankcase half shells 1, 2 and the cylinder head wedges 3, 4 is ensured by gaskets 21 and by the metal-to-metal contact between them.

Each piston $5b$, $5c$ has cavities $5b_3$, $5b_4$ and $5c_3$, $5c_4$ behind each of its large faces, which cavities correspond, when the piston is at the end of its stroke, with the cavities $3d$, $3e$ and $4d$, $4e$ respectively in the cylinder head wedges 3, 4 to form, together, the combustion chambers.

The crankcase half shells 1, 2 and the cylinder head wedges 3, 4 comprise a network of ducts and chambers 22 forming double walls and, therebetween, a flow area for the cooling fluid. This fluid is admitted into the body of half shell 2 via inlet 23 and leaves half shell 1 via outlet 24 and is circulated by means of a pump, hose and radiator (not shown).

The piston shaft $5a$ contains a hollow space $5d$, which provides a weight reduction and, moreover, another means of cooling the shaft, by causing coolant to flow therein.

The engine is lubricated by oil injected into the air/fuel mixture admitted to the chambers. The firing order is, for example, assuming the chamber parts on either side of the pistons are numbered from 1 to 4 in a clockwise direction, 1-2-3-4. Obviously, the firing order could be different and correspond, for example, to that of an engine with six, eight or twelve cylinders, provided the spherical engine were provided with an equivalent number of chambers and rotary pistons.

The valving can be lubricated by a low-pressure pump placed at the end of the shaft, with a spraying system for each cylinder head. The camshafts are driven by a cogged belt cooperating with pulleys, one of which is fixed to the rotary output shaft which will be further described hereinafter.

The gaseous air/fuel mixture is supplied by one or more conventional carburetors.

Figure 3:
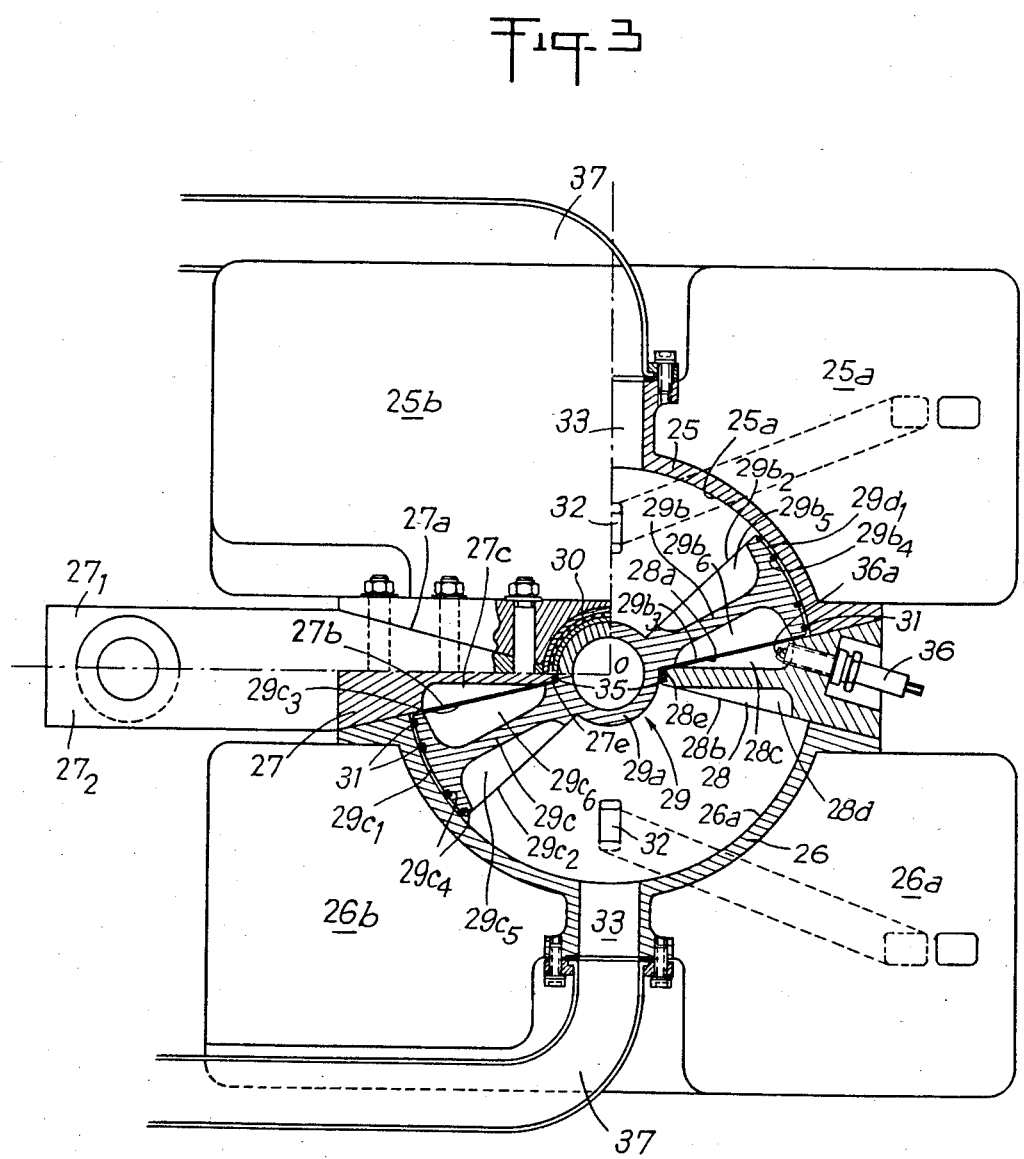
FIG. 3 is a cutaway view across an engine according to the invention designed to operate on a two-stroke cycle.

Referring now to FIG. 3, which is a cutaway cross section of an engine according to the invention, designed for two-stroke operation, the engine shown is very similar, in terms of its basic design, to the one just described with reference to FIGS. 1 and 2. It has two crankcase half shells 25, 26, each containing a chamber 25a, 26a in the form of a spherical segment. These two half shells are assembled across from one another as in the engine of FIG. 1, on two wedge-shaped cylinder heads 27, 28 having a straight isosceles triangular cross section the plane sides whereof 27a, 28a and 27b, 28b converge in pairs towards a line located near the center of the spherical enclosure formed by said crankcase half shells. As this type of engine has no valves, its cylinder head wedges 27, 28 are smaller and, conversely, its spherical chambers 25a, 26a larger. A rotor or dual piston 29 is reciprocatingly rotatively mounted within the two crankcase half shells 25, 26 fitted to the two cylinder head wedges 27, 28, said rotor/piston, like piston 5 of FIG. 1, consisting of a shaft 29a and two diametrically opposite pistons 29b, 29c. This rotor is mounted about two bearings 30 entirely like bearings 8 of the 4-stroke engine and the pistons are also shaped as semicircular vanes whose edge $29b_1$, $29c_1$ moves in front of and close to the inside wall of chambers 25a, 26a.

One particular feature of this engine is that the pistons 29b, 29c are shaped as spherical wedges whose plane faces $29b_2$, $29c_2$ and $29b_3$, $29c_3$ flare out from the shaft 29a at an angle of, say, 30°. As with the previous rotor 5, the peripheral edge of each piston is provided with grooves $29b_4$, $29c_4$ in which sealing strips 31 are fitted, said strips being identical to those of the 4-stroke engine, but being four in number per piston. The shape of these pistons 29b, 29c is specifically designed to enable this engine to work on a two-stroke cycle, clearing, according to a given firing order, air intake ports 32 and then exhaust ports 33. In an engine according to the invention comprising two pistons 29b, 29c, arranged opposite one another, the intake ports 32 and exhaust ports 33 are located in a diametrical plane going through the axis of the dual piston 29. In the embodiment depicted in FIG. 3, this plane is also the plane of symmetry or center plane of the cylinder head wedges 27, 28 and there are two intake ports 32 per chamber, arranged symmetrically with respect to a diametrical axis perpendicular to the rotational axis of the rotor 29 which passes through the center of the spherical chamber. Ports 33 are coaxial with said diametrical axis. The intake ports 32 are oblong and extend in the direction of said diametrical axis. For example, these ports can be rectangular, as shown in the figure, with a cross section roughly equal to half that of an exhaust port.

The cylinder head wedges 27, 28 comprise cavities 27c, 28c, 27d, 28d similar to those in the cylinder head wedges 3, 4 of the 4-stroke engine, except that they are smaller. These cavities 27c- 28d match up with other cavities $29b_5$, $29b_6$, $29c_5$, $29c_6$ left open in piston 29, which are also similar to those in piston 5 of the previously described engine.

As in the previous engine, the edges 27e, 28e of the cylinder head wedges 27, 28 are located near the shaft 29a of the rotor 29, and sealing is provided in the same way, by means of two sealing elements 35 contacting said shaft 29a. Also, as in the previous embodiment, each cylinder head wedge 27, 28 has two spark plugs 36 screwed into a tapped hole in the wall of the cylinder head, whose electrodes 36a project into the cabities 27c, 27d, 28c, 28d.

Engine cooling is obtained by means of fins 25a, 25b, 26a, 26b parallel with the diametrical center plane perpendicular to the rotational axis of piston 29. These fins have a basically rectangular outline and are assembled into four symmetrical pairs in relation to the plane in which lie center lines of the exhaust ports 33 and to the plane in which lie the cylinder head wedges. This arrangement allows access to the spark plugs 36 and to the exhaust pipes 37 connected to said ports 33.

Tightness between the crankcase half shells 25, 26 and the cylinder head wedges 27, 28 can be assured, by way of example, and as shown in FIG. 3, by a metal-to-metal seal.

Due to the spherical segmental shape of the pistons 29b, 29c and to their size, the compression and expansion stroke is augmented relative to the intake/exhaust transfer stroke.

To the contrary of a conventional two-stroke engine, this engine does not use the compression on one side of the piston to supply the other side. Fresh air is provided by a compressor to inject the firing mixture and exploit both parts of the chamber 25a, 26a located to each side of the pistons 29b, 29c for power purposes.

Like the shaft 5a of dual piston 5 of the four-stroke engine, the shaft 29a of rotor 29 is hollow for coolant flow -- and in this case airflow -- purposes.

Referring now to FIGS. 4 and 5, the two-stroke embodiment of the engine according to the invention is shown together with its associated ignition and carburetion apparatuses, and the means serving to convert the piston's (29) reciprocating rotation into a continuous rotational drive.

Significantly, these means can just as easily be used with the 4-stroke engine of FIG. 1 or the 2-stroke engine of FIG. 3.

The cylinder head block 27 has two arms $27_1$, $27_2$ extending in the same plane and parallel to one another. These two arms are spaced apart and their outside edges are substantially tangent to the spherical crankcase halves 25, 26. Said arms support bearings 38 in their free ends, rotatively supporting a shaft 39. The end of the shaft on the outside of arm $27_2$ is connected to a flywheel 40 which is attached thereto by any suitable means and the other end of the shaft, projecting beyond arm $27_1$ is fitted with a V-groove pulley 41 moving with said shaft. A V-belt 42 around the latter pulley connects the shaft with the shaft 44a of a volume compressor 44, via a second, smaller diameter pulley 43 moving with said compressor shaft. The compressor 44 is connected via a line 45 to a carburetor 46 which is itself connected via lines 47, 48 to the intake ports 32. Thus, the carburetor used with an engine having two hemispherical chambers has four intake lines, i.e. two lines 47 and two lines 48.

The engine is lubricated by an oil pump 49 mounted on the end of arm $27_1$. The pump is rotatively driven by a pair of pinion gears, one of which 50 is fitted to the shaft 39 between the pulley 41 and the arm 27₁ and the other 51, being of a smaller diameter, is fitted to the pump shaft. The oil pressurized by metering pump 49 is injected through a set of lines 52 into the carburetor 46 where it is mixed with the intake gas. Gear 50 enables the transfer of power to a gearbox, a clutch or other device. The shaft of the dual piston 29a projects from the crankcase 25, 26/cylinder head 27,28 unit. Its end nearest the carburetor 46 is fitted with a distributor 53 wired to the spark plugs 36. Its other end, on the side of flywheel 40, is fitted with a crank pin 54 keyed or otherwise designed to move with said shaft. The crank pin 54 is jointed to a connecting rod 55 which is in turn articulably connected to a shaft mounted perpendicularly to the outside face of the flywheel 40, offset from the center thereof. The oscillation of crank pin 54 as it is reciprocatingly rotatively driven in the direction of arrows $F_1$, $F_2$ by rotor 29 is converted to steady or continuous rotation by said connecting rod/crank unit continuously rotatively driving flywheel 40 and, pursuant, shaft 39 which has also been called the power take-off shaft.

Figure 6:
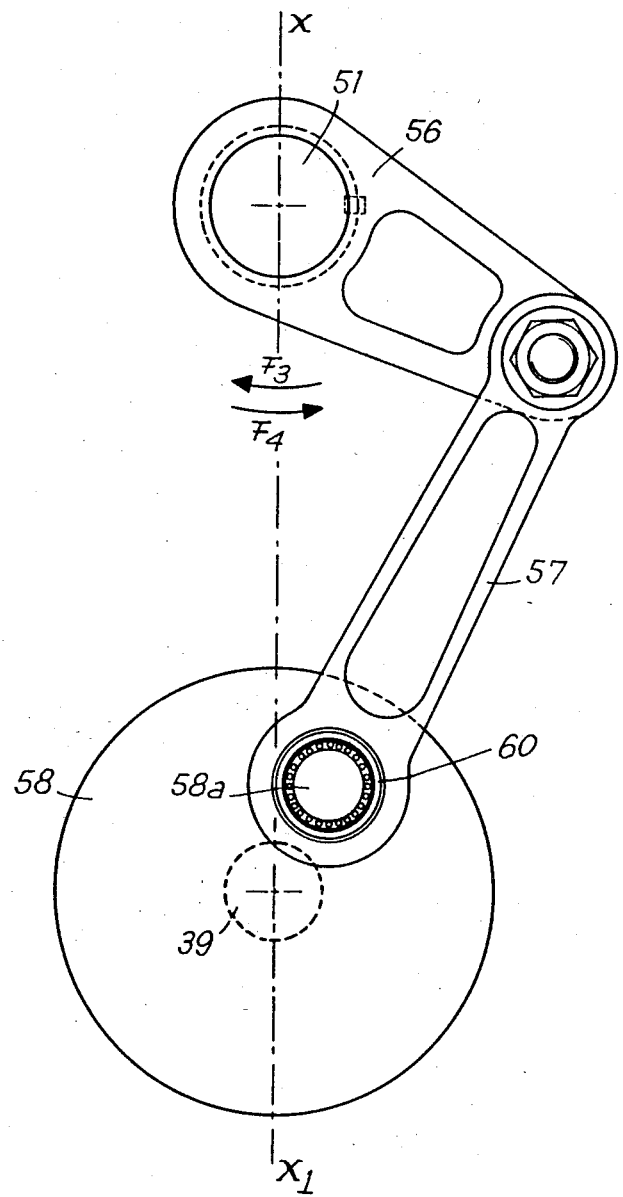
FIG. 6 is a front view of an alternative connecting rod assembly for the engine according to the invention.

An alternative connecting rod assembly subject of the present invention is illustrated in FIG. 6.

The components of this assembly are similar to those previously described with reference to FIGS. 4 and 5. Accordingly this rod system consists of a crank pin 56 fixed to the shaft of reciprocating rotor 5/29, a connecting rod 57 swivelably connected to said pin 56 as well as to a flywheel 58 fixed to the power takeoff shaft 39. A particular feature of this conrod assembly is that the crank pin 56 swivels back and forth in transverse direction $F_3/F_4$ and symmetrically about an imaginary line X—X₁ going through the rotational axis of the piston shaft 5a/29a and the rotational axis of the so-called power take-off shaft 39.

To avoid friction or sticking points that might develop when the crank pin 56 reaches the end of its stroke, at the right dead center or left dead center position, one of the swivel joints is resiliently mounted. As shown in the figure, this resilient joint is provided on the eccentric shaft 58a of flywheel 58 connecting with rod 57. A needle bearing 59 closely surrounds said shaft 58a. The resilience or elasticity is provided by means of an elastomer ring 60 surrounding said bearing 59 and fitting into the eye 57a of the connecting rod.

The operation of the four-stroke engine according to the invention will now be described with reference to the diagrams of FIGS. 11 through 14.

Each of the chambers 61, 62 in which the piston 63, 64 operates is divided into two chamber sections on either side of the piston. By analogy with a conventional four-cylinder engine, these chamber sections are numbered from 1 to 4 in the figures, in a clockwise direction.

The firing order is 1-2-3-4.

Figure 11:
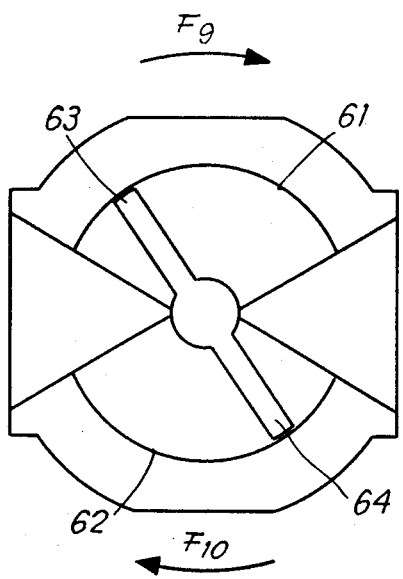
Figure 12:
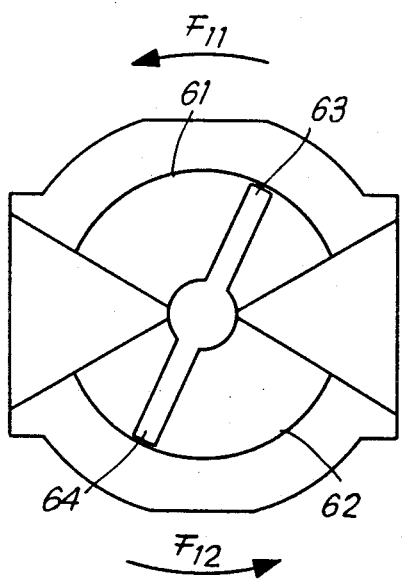
Figure 13:
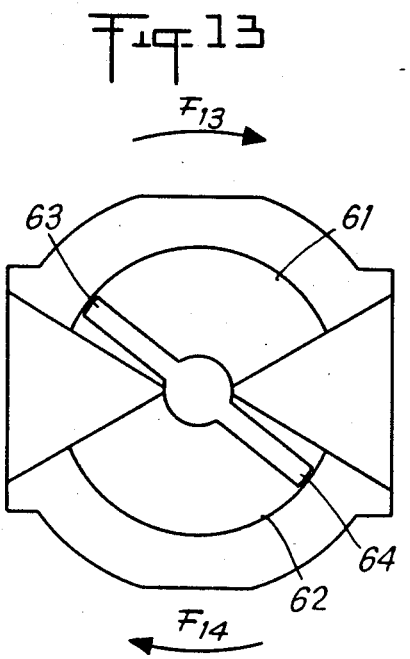
Figure 14:
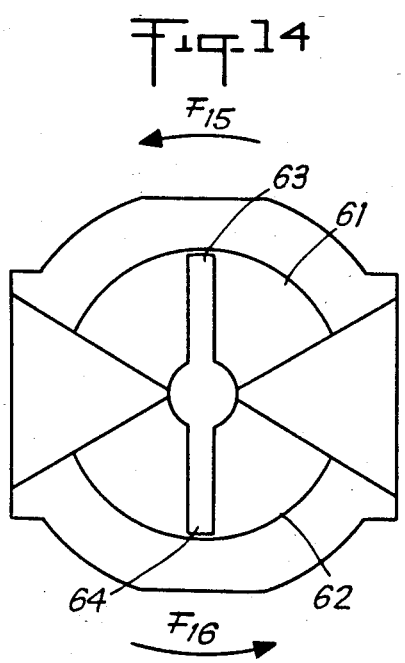

In FIG. 11, the piston 63 pivots in the direction of arrow $F_9$ and the other piston end 64, in the direction of arrow $F_{10}$. The cycle proceeds as follows:
1- Combustion/expansion
2- Compression
4- Exhaust
3- Intake In FIG. 12, the piston 63 pivots in the direction of arrow $F_{11}$ and piston 64 in the direction of arrow $F_{12}$. The cycle proceeds in the following order:
1- Exhaust
2- Combustion/expansion
4- Intake
3- Compression In FIG. 13, piston 63 pivots in the direction of arrow $F_{13}$ and piston 64 in the direction of arrow $F_{14}$, giving the following cycle:
1- Intake
2- Exhaust
4- Compression
3- Combustion/expansion In FIG. 14, piston 63 pivots in the direction of arrow $F_{15}$ and piston 64 in the direction of arrow $F_{16}$, giving the following cycle:
1- Compression
2- Intake
4- Combustion/expansion
3- Exhaust.

Finally, operation of a two-stroke engine according to the invention is diagrammed in FIGS. 7 to 10.

As in the previous example, each of the chambers 65, 66 is divided into two sections, one on each side of the piston. These chamber sections are numbered from 1 to 4, clockwise.

Ignition occurs simultaneously in sections 1 and 3 or in sections 2 and 4.

Figure 7:
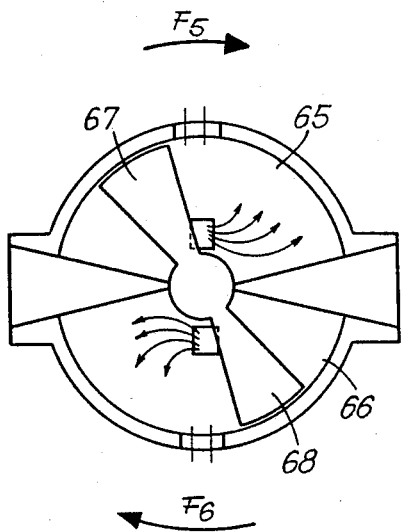

In FIG. 7, piston 67 pivots in the direction of arrow $F_5$ and piston 68 in the direction of arrow $F_6$, according to the following cycle:
1- Combustion/expansion
2- Gas transfer: intake/exhaust
3- Combustion/expansion
4- Gas transfer: intake/exhaust.

Figure 8:
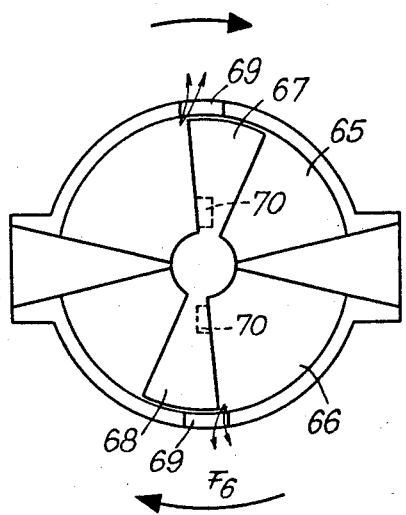

In FIG. 8, piston 67 pivots in the direction of arrow $F_5$ and piston 68 in the direction of arrow $F_6$. Said pistons, in passing, cover the exhaust ports 69 and the intake ports 70. The cycle proceeds as follows:
1- Exhaust
2- Compression
3- Exhaust
4- Compression.

Figure 9:
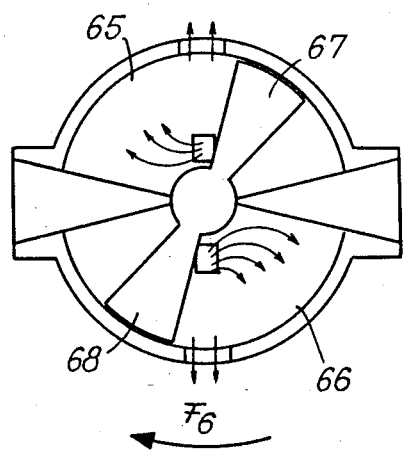

In FIG. 9, piston 67 pivots in the direction of arrow $F_5$ and piston 68 in the direction of arrow $F_6$. The moving pistons have passed beyond the exhaust ports 69 and intake ports 70, the latter thus being opened and leading into each of the chamber sections 65, 66. The cycle is as follows:
1- Gas transfer: intake/exhaust
2- Compression
3- Gas transfer: intake/exhaust
4- Compression.

Figure 10:
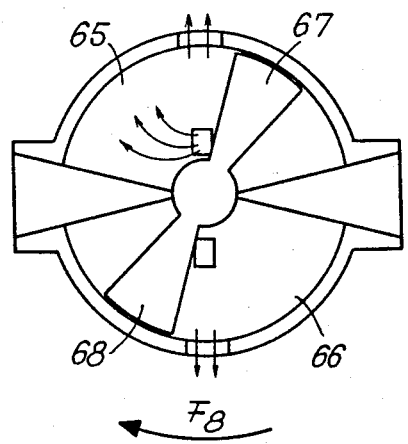

In FIG. 10, piston 67 pivots in the direction of arrow $F_7$ and piston 68 in the direction of arrow $F_8$. The operating cycle is as follows:
1- Gas transfer: intake/exhaust
2- Combustion/expansion
3- Gas transfer: intake/exhaust
4- Combustion/expansion.

I claim:
1. A thermal engine comprising a spherical chamber having a predetermined diameter within which moves a piston reciprocatingly rotatively thereto, said piston being mounted about a rotating shaft going through the center of said chamber, which chamber is sealed by a cylinder head, said engine further comprising external means for converting the reciprocating rotation of the piston into a continuous rotation, the piston has an overall shape of a semi-circular vane manolithic with said rotating shaft and extending orthogonally along the generatrices of the shaft, said piston having a slightly smaller radius than that of the spherical chamber so that it can move along and near an inside wall of said chamber, sealing being provided between the piston and the chamber wall in the form of at least one continuous sealing strip embedded in a groove in a periphery of the piston, said continuous sealing strip extends at both of its ends into a respective recess formed in said shaft at a junction where said periphery of said piston joins said shaft to complete the seal between the piston and the chamber, the cylinder head extends along the diameter of the chamber and comprises on at least one side of said shaft and near thereto an edge parallel with said generatrices of the shaft with a sealing means between said shaft and said cylinder head being provided by at least one insert embedded in a groove along an entire length of said edge, said sealing insert has ends extending beyond the inside wall of the spherical chamber to complete the seal between said cylinder head and said shaft.

2. Engine according to claim 1, having external means to convert said piston's reciprocating rotation into a continuous rotation consisting of a connecting rod assembly including a crank pin fixed to the shaft of the piston and a connecting rod swivelably mounted to said crank pin and having a crank fixed to the rotational output shaft, wherein said crank pin pivots back and forth across and symmetrically to a line going through the rotational axis of the piston and the rotational axis of the "power takeoff" shaft, there being connecting rod assembly joints between the rod and crank and between the rod and crank pin, and wherein at least one of said connecting rod assembly points is elastically fitted.

3. An engine according to claim 1, wherein said cylinder head consists of at least one wedge-shaped block having an isosceles triangular cross-section wherein plane faces face the piston at the end of its stroke and coverge on a line through the center of said chamber, at least one of said faces containing a cavity housing, and an explosion generating means.

4. An engine according to claim 3, wherein said piston is shaped as a spherical wedge havihg plane faces which flare out from the shaft and include a cavity matching up with said cavity in the cylinder head when the piston is at an end of a stroke.

5. Engine according to claim 3, wherein said piston is shaped as a spherical segment having parallel faces which include a cavity matching up with said cavity in the cylinder head when the piston is at an end of a stroke.

6. Engine according to claim 3, wherein two spherical wedgeshaped chambers are provided, arranged opposite one another and attached to said cylinder head, with one piston working in each chamber, said pistons extending diametrically opposite one another from said shaft.

7. Engine according to claim 1, operating according to a two-stroke cycle, wherein both intake ports and exhaust ports are provided in the wall of the spherical chamber and are located in a diametrical plane passing through the axis of said piston.

8. Engine according to claim 7, wherein said intake ports are symmetrically disposed with respect to an axis perpendicular to the axis of said piston and passing through the center of the chamber.

9. Engine according to claim 8, wherein said intake ports have an oblong outline and are oriented parallel to said diametrical plane.

* * * * *